April 23, 1940.     H. REFFELT ET AL     2,198,060
REINFORCED PHONOGRAPH RECORD
Filed May 2, 1939
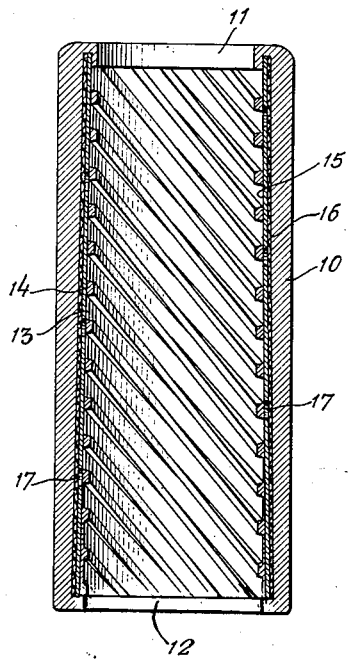
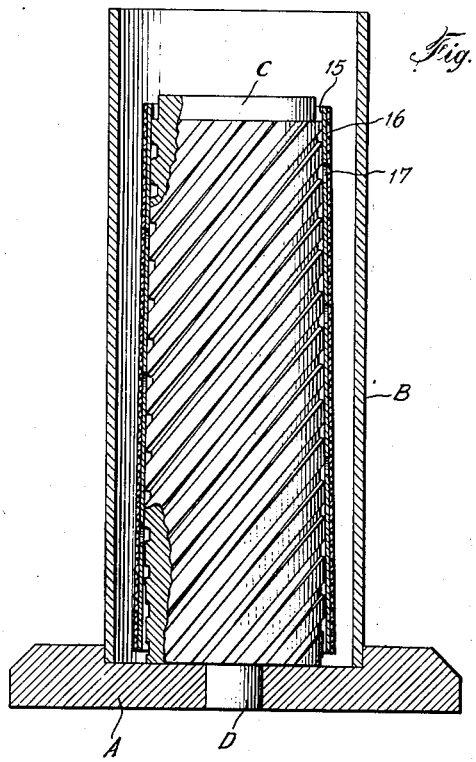
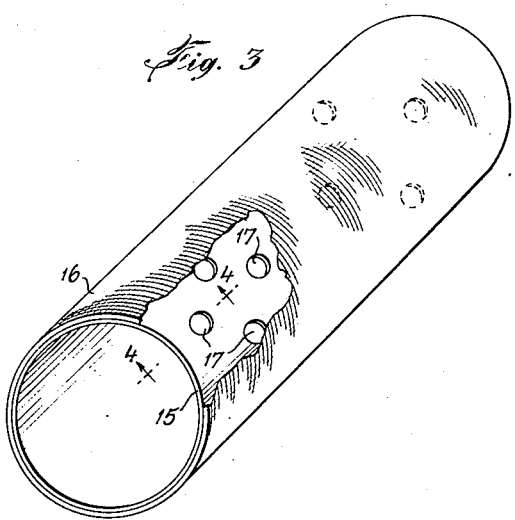
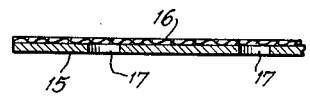
INVENTORS
Herman Reffelt and Charles Cagnon
BY Benjamin Webster
ATTORNEY.

Patented Apr. 23, 1940

2,198,060

UNITED STATES PATENT OFFICE 2,198,060

REINFORCED PHONOGRAPH RECORD

Herman Reffelt, Brooklyn, and Charles Cagnon, New York, N. Y.

Application May 2, 1939, Serial No. 271,306

2 Claims. (Cl. 274—44)

The invention relates to reinforced sound records of the cylindrical type such as are used on phonographs, dictating and similar machines.

One of the chief objects of the invention is to provide such a sound record, usually made of wax, that breakage will be minimized, and that the shattering and separtion of parts of the record will be prevented so that in case of cracking of the record, the recording on the cracked part may be taken off without the loss of any part of the recording. Another object of the invention is to provide such a reinforcing medium for the record that it maintains its original shape during the molding of the record and permits easy permeation to the threaded core of the mold during the process of manufacture. Another object is to use such a reinforcing medium that will not interfere with the normal expansion and contraction of the cylindrical record inside by changing temperatures. Another object of the invention is to provide such a reinforcing medium, that it will thoroughly adhere to the material of which the records are made and also will absorb the material of which the records are made so that it is thoroughly integrated with the record. Another object of the invention is to provide a low cost reinforcing medium and to provide such a medium that may be introduced for manufacture at a low cost. Another object is to provide such a medium and so positioned in the record that the record may be uniformly reamed throughout to a similar depth on the inner surface of the cylinder.

In a preferred form of the invention we use a thin slightly tapered cylindrical shell of such a size that it easily fits over the core of a mold and maintains its original form thereon without bulging into the threads of the core during manufacture. This thin shell may comprise a laminated structure having a plurality of plies, one of which may be highly absorbent of the material of which the cylinder is made and the other of which may be of a more rigid structure so that when the two plies are united by any suitable means, such as adhesive, the two united cylinders form a thin cylindrical shell. We have found that absorbent paper is an excellent material for one of the laminations and that a woven textile fabric such as cotton is an excellent supporting lamination. In order to permit the flow of the molded material through the shell, we have found that a number of perforations distributed throughout the cylinder thru one or both laminations permits the molded material to flow through and easily fill the grooves in the core before the heat is lost from the material and the material itself solidifies or cools to retard its flow. In preparing this thin cylindrical reinforcing shell, a sheet of perforated absorbent paper may be placed on the textile fabric, such as linen or cotton, and the two laminations rolled or otherwise pressed together and integrated and thereafter rolled into cylindrical form of the required size and suitably secured together at the edges by any suitable means such as an adhesive.

Another advantage in the record arising from the use of this improved thin shell in manufacture, is that an additional inside band or reinforcing rim may be formed during the molding operation so that the finished record has a reinforcing inside band at each end which tends to strengthen the finished record and increase its longevity.

In a modified form, one of the cylinders may be formed of an absorbent textile fabric which is non-rigid, and another similar cylinder of textile fabric which is sufficiently rigid to maintain the form of the cylinder when the two cylinders are connected together.

In another modification of the invention, the two cylinders may be formed, one of non-rigid absorbent textile fabric, and the other of textile fabric sufficiently rigid to maintain the form of the cylinder, both cylinders being interwoven together.

The method of manufacturing our improved phonograph record comprises placing a tapered cylinder of absorbent and porous material on the core of the mold. The novel construction of this cylinder, having in addition to the porous and pervious qualities, the characteristic that when the hot material is poured into the mold, this thin cylinder is sufficiently rigid to maintain its original form, and not to bow into the threads of the core of the mold. The hot material is poured into the mold and later the threads of the cylinder are reamed out. Our improved reinforcing and absorbent cylinder prevents the cutting of the material of this thin cylinder during the process of reaming, and also assures that by its remaining in its original form without outward bulging the record can be repeatedly used to a uniform depth. The use of this thin absorbent and pervious cylinder permits the material in the mold to readily pass through while hot and to form smooth, annular bands on the inside of the cylinder at both ends so that a stronger cylinder is produced.

Other materials than those specified may be substituted having the same properties and results in the construction.

Reference is made to the drawing which illustrates a preferred form of the invention, in which Fig. 1 is a vertical section through the improved record.

Fig. 2 shows the mold with a core in place and the improved laminated reinforcing element mounted on the core prior to pouring in the molten material from which the record is formed.

Fig. 3 is a perspective view of the reinforcing element with a part of the outer fabric lamination broken away to show holes in the absorbent lamination of the element.

Fig. 4 is a section on the line 4—4 of Fig. 3.

The record 10 is formed of any material suitable for sound recording and the outer wall is in the form of a cylinder, but the inner wall, which is threaded, is tapered inwardly from one end to the other, as is required in the manufacture to conform with the threads of a core C and has at the ends an annular wall 11 which reinforces the cylinder at one end and an annular wall 12 which reinforces the other end of the cylinder.

Spiral grooves 13 are formed in the inner wall by threads 14 which are adapted to fit on the mandrel in a dictating or a similar machine. A reinforcing element comprises one lamination of highly absorbent material 15, such as blotting paper, and a second lamination 16 of porous textile fabric, also absorbent and which is sufficiently rigid so that when the laminations 15 and 16 are secured together by adhesive or other suitable means, the element maintains its original form, during molding, when in position on the core C. The core C has a leg D which fits in an aperture in the base A which is also recessed on the upper surface concentric with the aperture and supports a cylindrical mold B. When the material of which the record is formed is poured in the molten condition between the core C and the inner wall of the mold B, the molten material passes through the textile fabric 16 and is absorbed by the absorbent paper 15 which may also have apertures 17 throughout its surface, for the free and ready access of the molten material to the grooves formed in the core C which are of the same outline as the threads 14 in the finished record. This assures that when the lands of the threads 14 are reamed to assure a true bore for fitting on the mandrel of a dictating machine, the wall 15 is in its original form and is not cut or mutilated by the reaming process. The threads of the rigid member 16 also absorb the material and the two laminations become thoroughly saturated with and embedded in the material of the record so that if the record is dropped after dictation has been taken on the surface and cracked, the cracked portion will not leave the cylinder, so that this portion of the record is not lost, but the recording can be taken off on the transcribing machine, thereby eliminating the necessity of reproducing the record by dictation as is now the practice in the art.

This invention not only provides a strong record, by having the inside annular reinforcing strips at each end, but also provides a stronger, more durable record by having the reinforcing element composed of two laminations which both absorb the material and become integral with it and also reinforce the material to prevent any cracked portion from breaking away from the record.

Having disclosed our invention, and realizing that, in view of the disclosure, many modifications in detail and substitution of materials will readily occur to those skilled in the art, we do not limit ourselves except as in the appended claims.

We claim:

1. A cylindrical sound record formed of sound-recording moldable material and having a tapering bore and a substantially cylindrical shell adjacent the bore and embedded in the material and comprising a substantially cylindrical lamination porous to the material when hot and of structure and substance absorbent of the molten material and another lamination closely fitting the first lamination and secured thereto but sufficiently rigid to hold its form before molding the record and also to support the first lamination in a cylindrical form before molding, said second lamination being also absorbent material, one lamination being perforated fibrous material and the other lamination being open-mesh threaded fabric.

2. A cylindrical sound record formed of sound-recording moldable material and having a tapering bore and a substantially cylindrical shell adjacent the bore and embedded in the material and comprising a substantially cylindrical lamination porous to the material when hot and of structure and substance absorbent of the molten material and another lamination closely fitting the first lamination and secured thereto but sufficiently rigid to hold its form before molding the record and also to support the first lamination in a cylindrical form before molding, said second lamination being also absorbent material, one lamination being apertured blotting paper and the other lamination being open-mesh threaded cotton fabric.

HERMAN REFFELT.
CHARLES CAGNON.